July 28, 1931.  C. T. McGAVIN  1,816,053
METHOD AND APPARATUS FOR HANDLING AND STORING VEHICLES
Filed Sept. 10, 1928  10 Sheets-Sheet 1
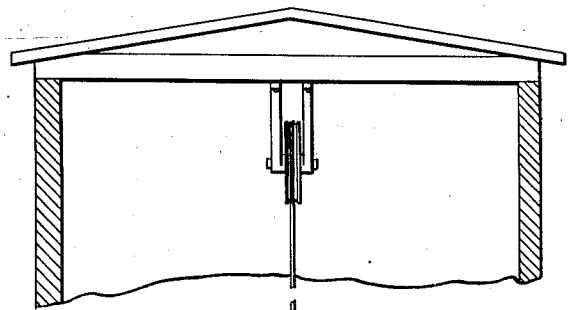
Fig. 31.
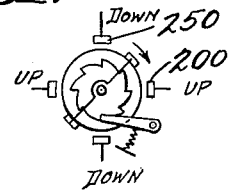
Fig. 1.
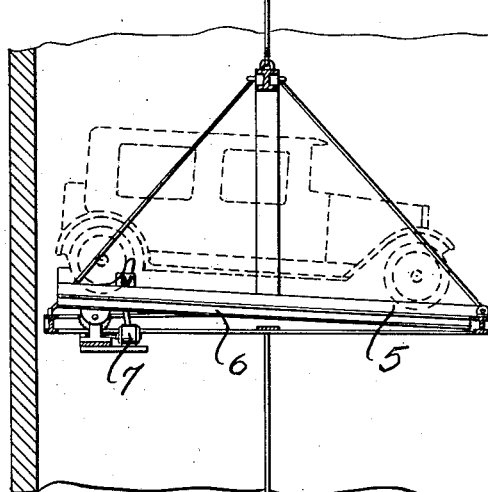
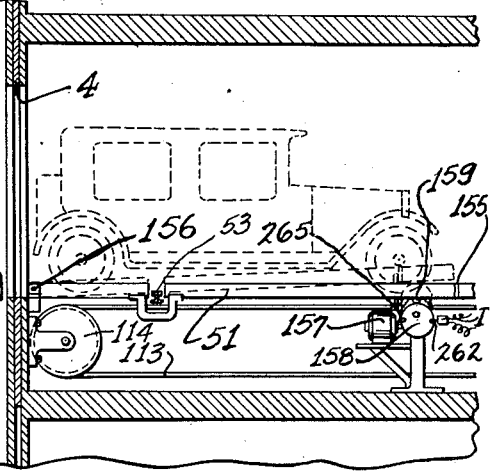
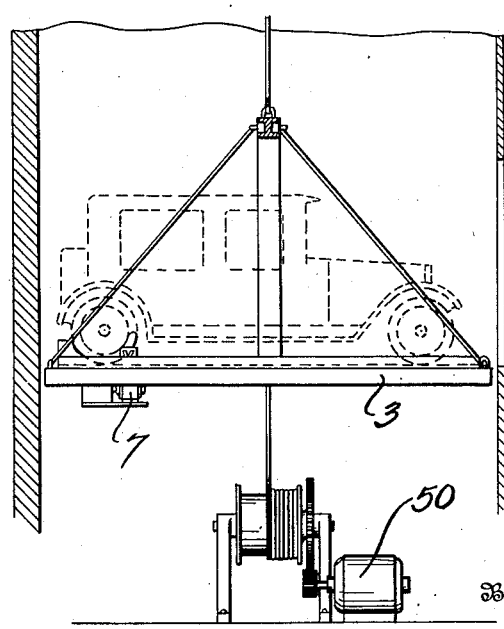
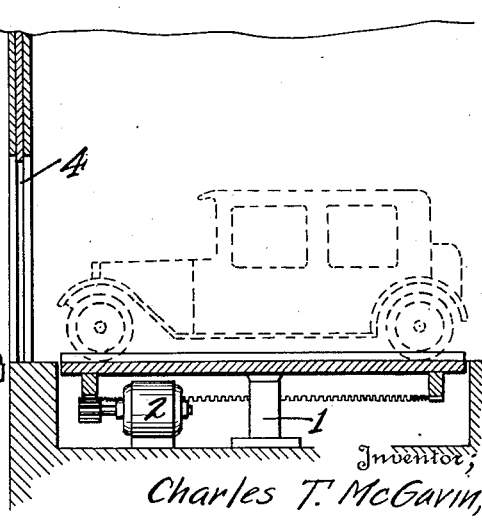
Inventor,
Charles T. McGavin,
By Lyon & Lyon
Attorneys July 28, 1931. C. T. McGAVIN 1,816,053
METHOD AND APPARATUS FOR HANDLING AND STORING VEHICLES
Filed Sept. 10, 1928 10 Sheets-Sheet 4
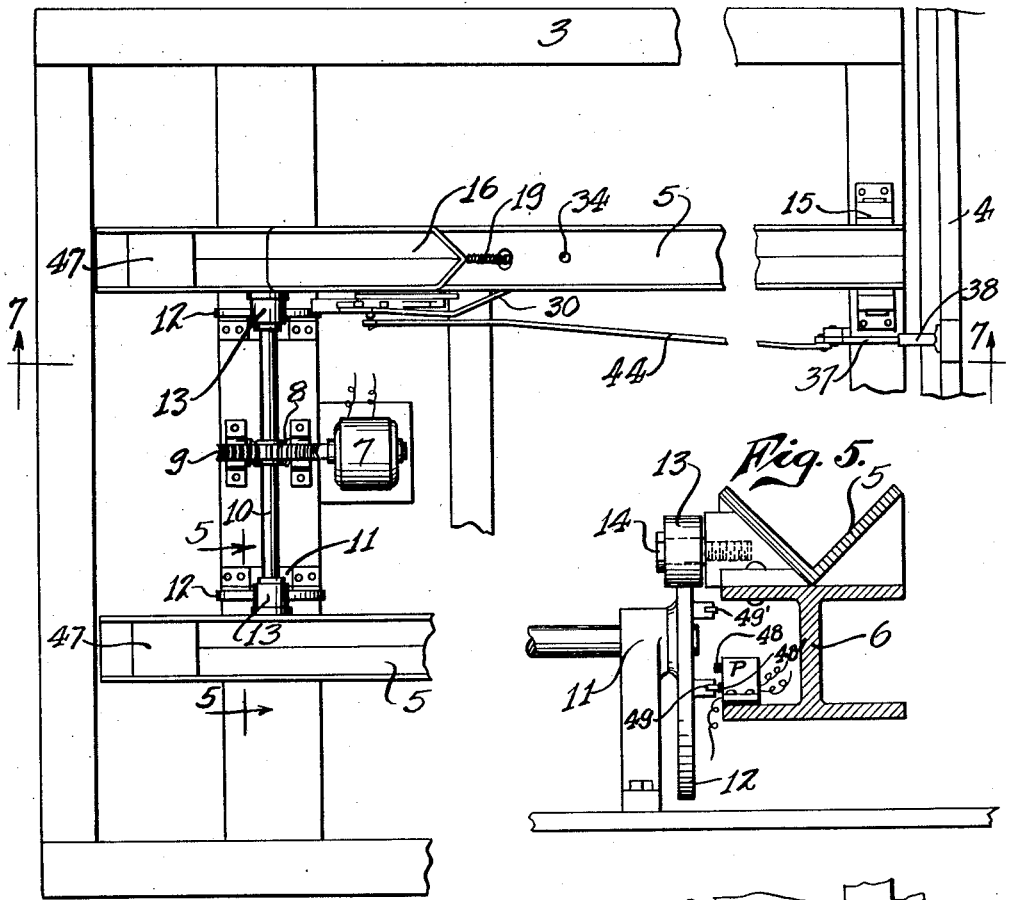
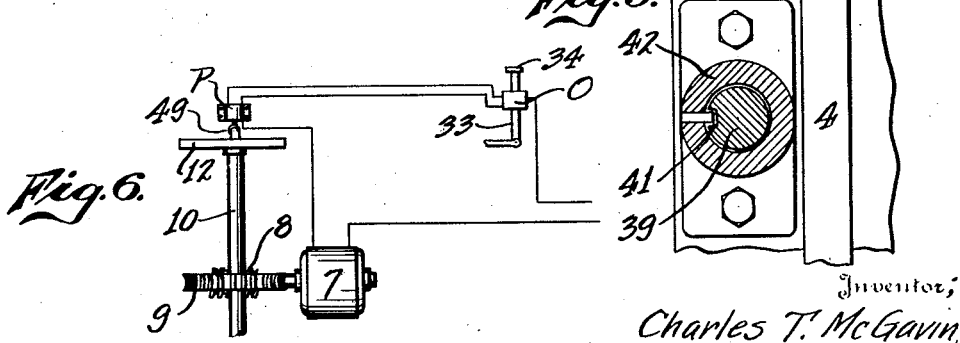
Inventor:
Charles T. McGavin,
By Lyon & Lyon
Attorneys

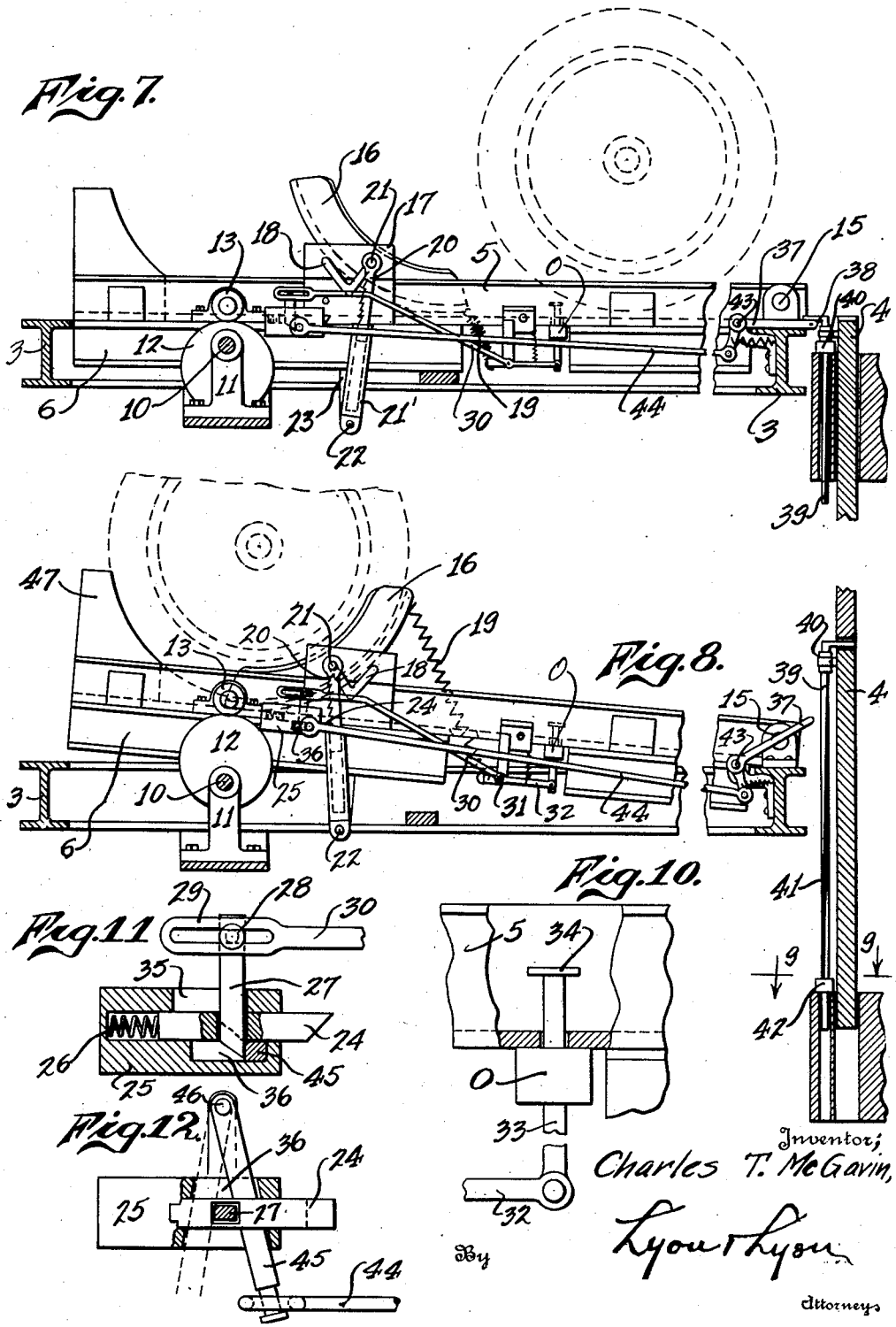

July 28, 1931.  C. T. McGAVIN  1,816,053
METHOD AND APPARATUS FOR HANDLING AND STORING VEHICLES
Filed Sept. 10, 1928  10 Sheets-Sheet 6
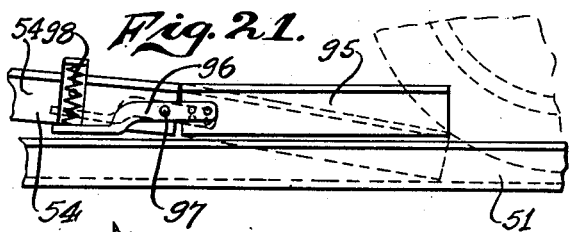
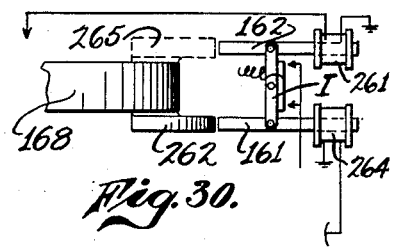
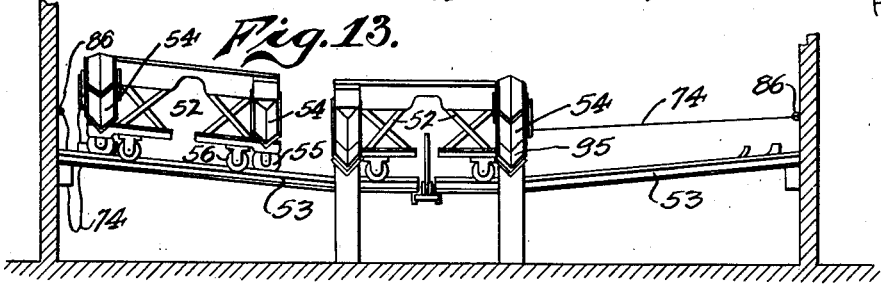
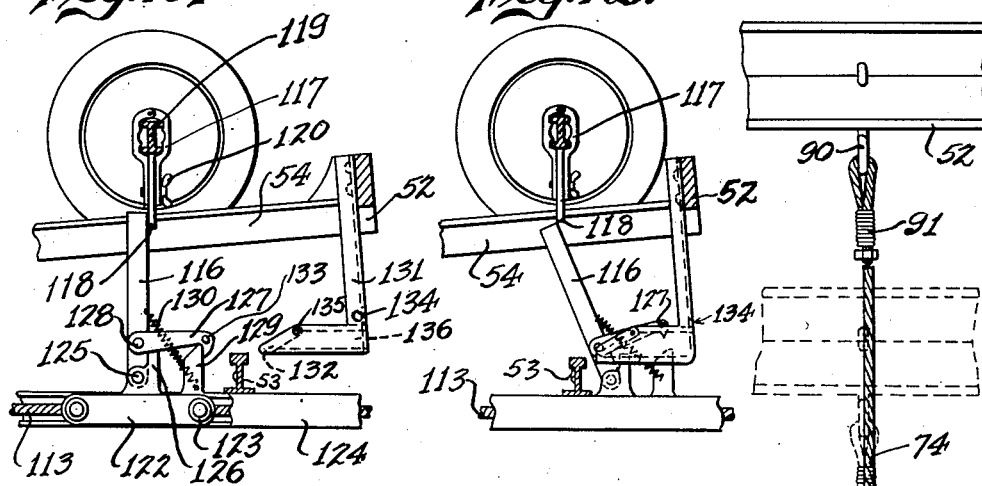
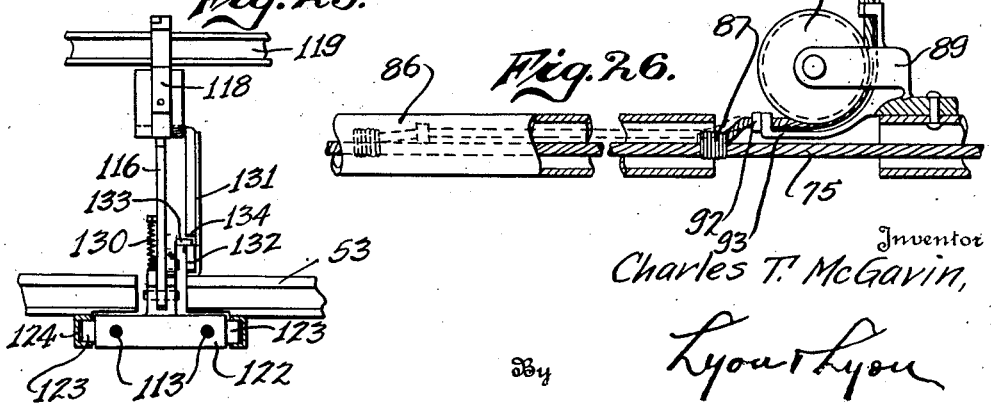
Inventor
Charles T. McGavin,
By Lyon & Lyon
Attorneys

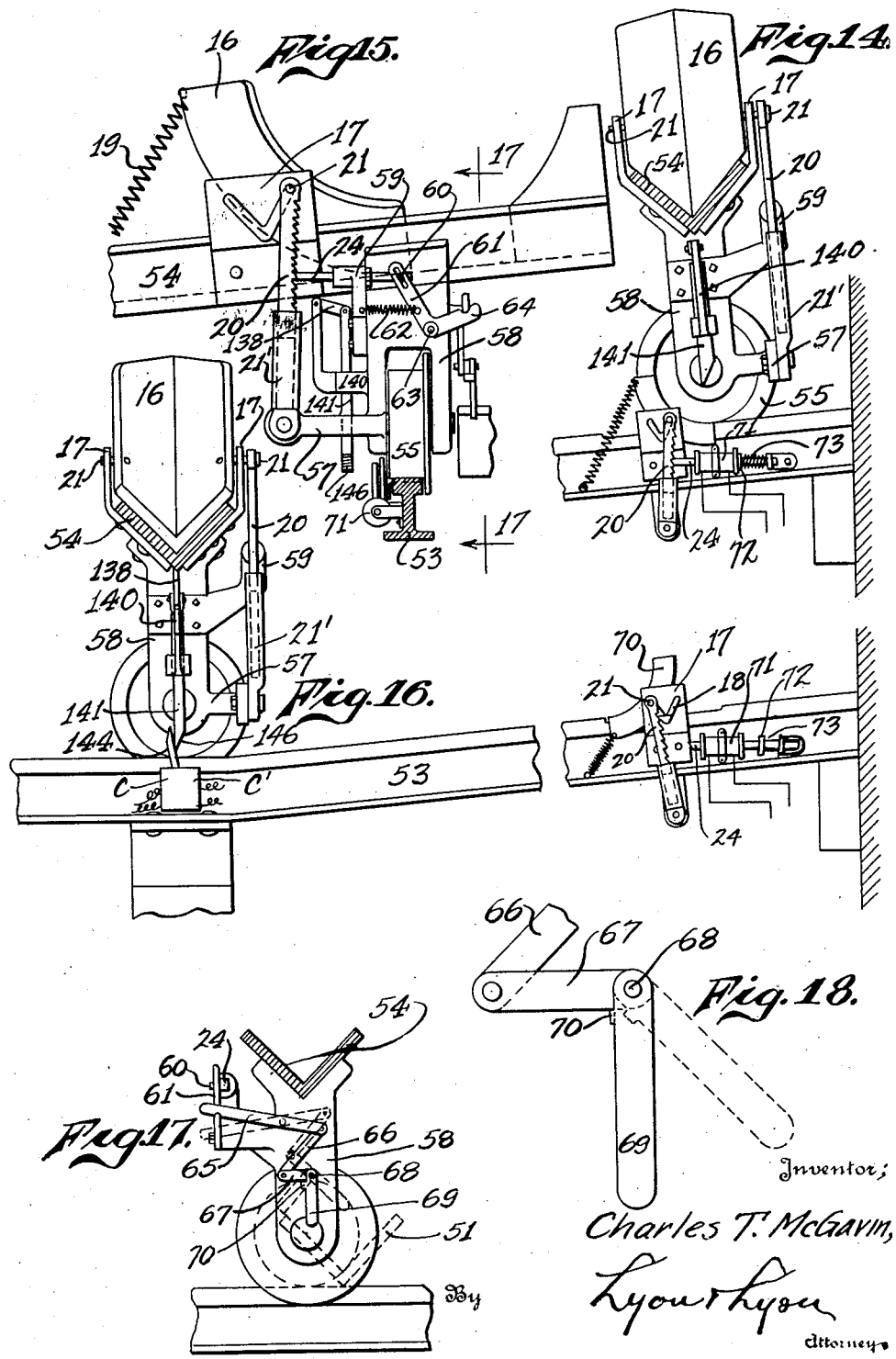

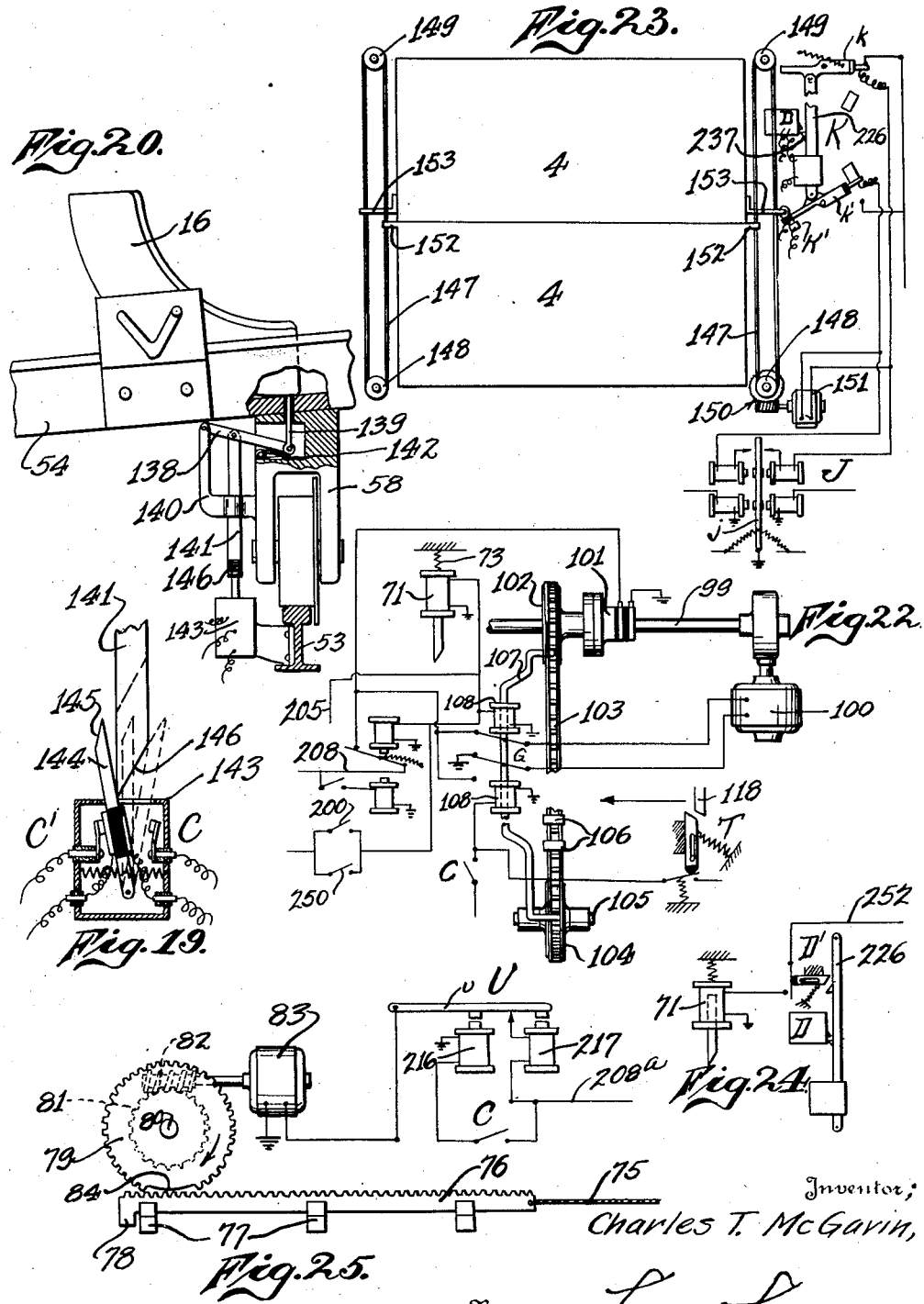

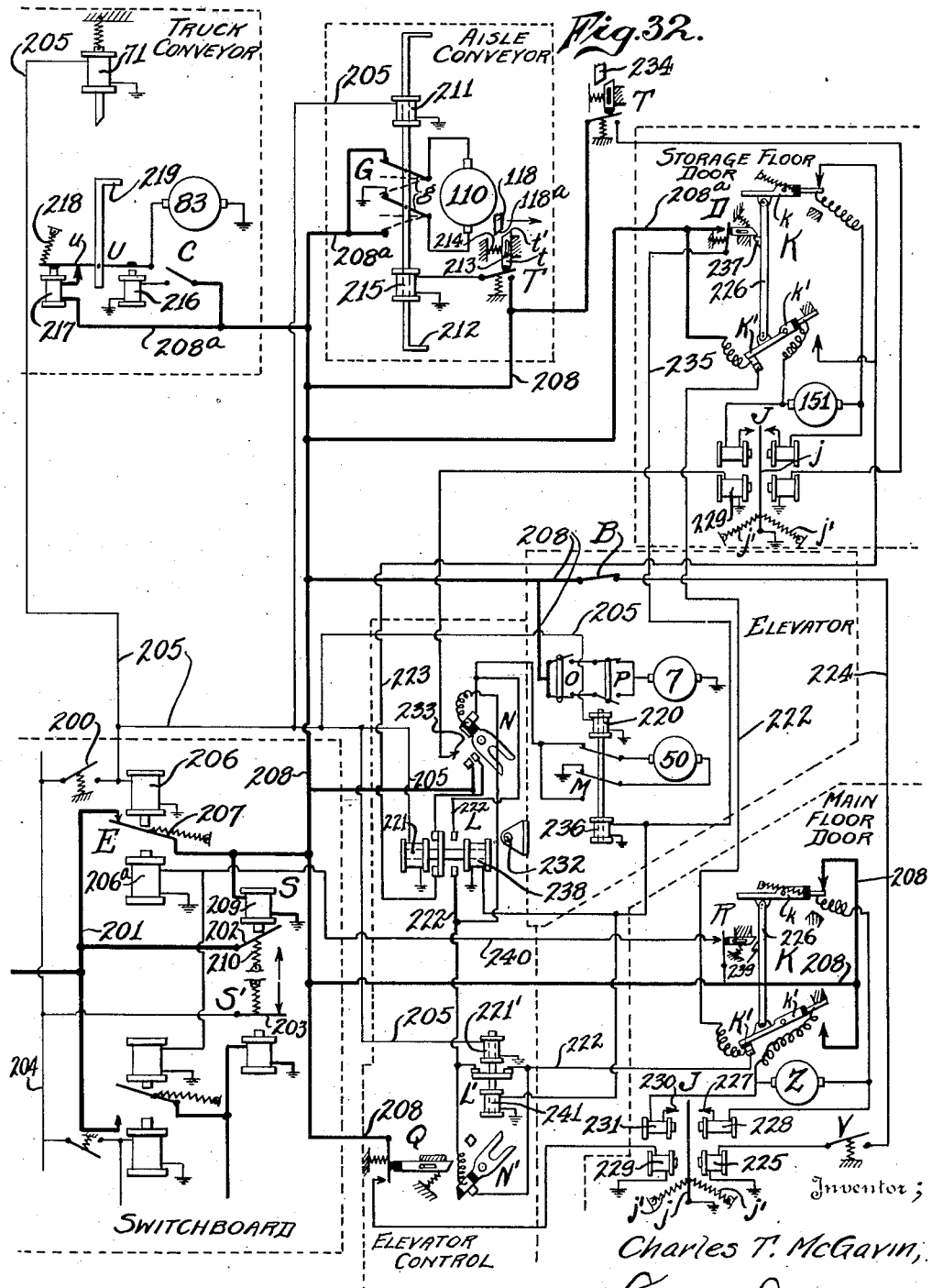

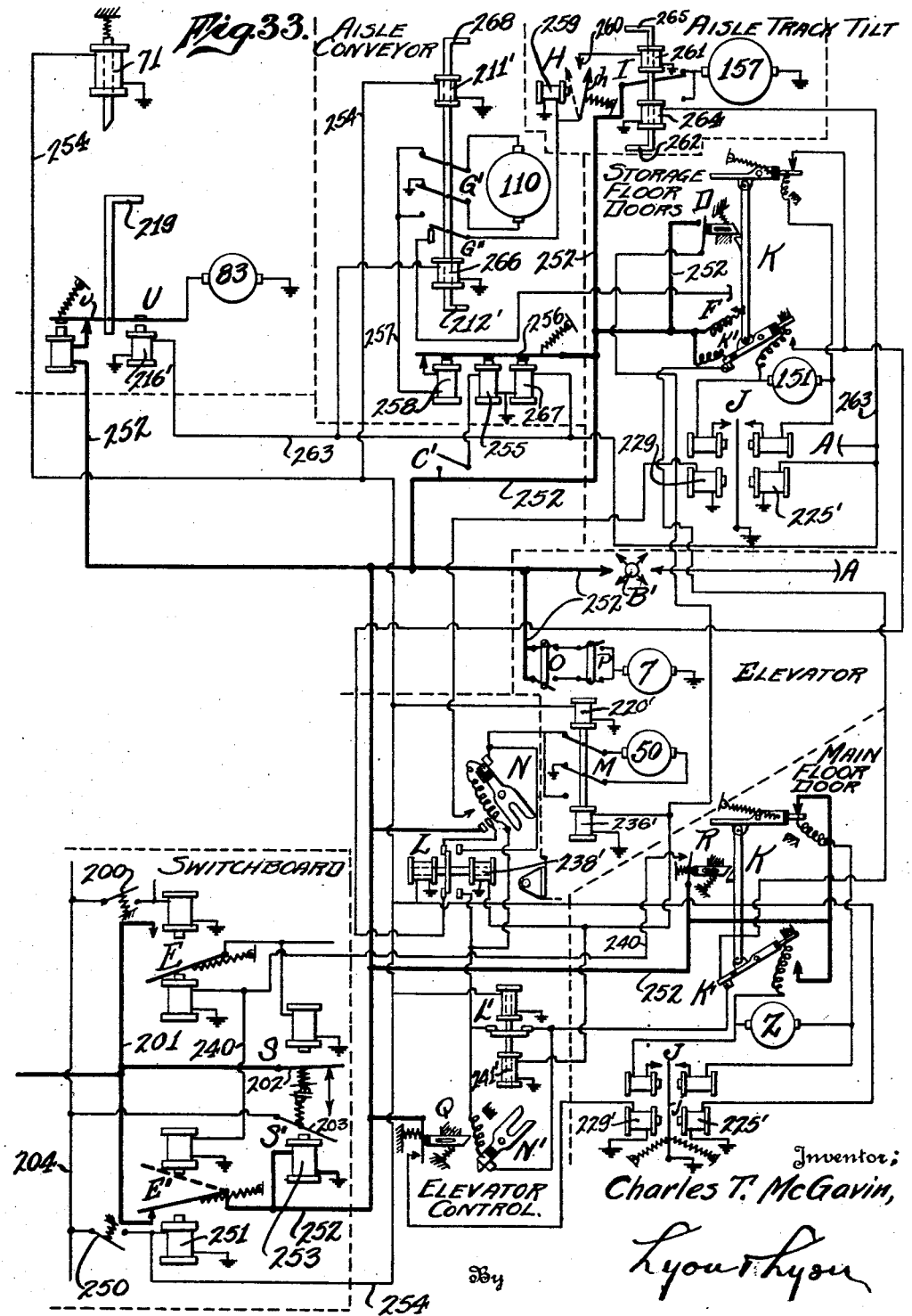

Patented July 28, 1931

1,816,053

UNITED STATES PATENT OFFICE

CHARLES T. McGAVIN, OF LOS ANGELES, CALIFORNIA

METHOD AND APPARATUS FOR HANDLING AND STORING VEHICLES

Application filed September 10, 1928. Serial No. 304,851.

This invention relates to a new and improved method of storing and handling vehicles and to means for moving, storing, conveying and selectively controlling the movement of vehicles in a storage system. Although the method and apparatus embraced by this invention is adapted for use in the handling and storing of vehicles or fabricated parts thereof, such as automobile bodies and the like, the detailed description hereinafter given will be limited to the application of the method and to means adapted to handle and store completed vehicles such as, for example, automobiles.

In handling and storing automobiles in large quantities, the previous methods necessitated the use of very large areas, a large proportion of such area being not devoted for storing purposes but for handling purposes only. Furthermore, the handling and storing of automobiles as hitherto used, involved the use of much labor and the vehicles were very often damaged during such handling.

An illustration of what has hitherto been considered the most effective arrangement for storing vehicles is the ramp garage in which vehicles are driven from floor to floor by means of ramps. These ramps occupy a great deal of space due to the long turning radius of most vehicles and necessitate the use of the car in the garage by mechanics or laborers unfamiliar with the characteristics of the vehicle.

Furthermore, the vehicles were then stored upon floors at right angles to the aisles that is, the longitudinal axis of the vehicle was at right angles to an aisle. This again necessitated the use of wide aisles because of the long turning radius of the vehicles. In other words, a very large area was devoted to aisles, ramps and other portions not available for storing purposes.

An object of my invention is to provide a method whereby vehicles may be conveyed, transported and stored in minimum space. Another object of my invention is to provide automatic means for transporting and storing vehicles. Another object is to provide a method whereby vehicles may be transported and stored without having said vehicles moved under their own power.

Another object is to provide means whereby conveying and storing actions may be coordinated so as the vehicle may be transported and stored in a very short period of time.

Other objects and advantages of my invention and adaptations thereof will become apparent to those skilled in the art from the following detailed description of one preferred form of my invention.

Broadly, my invention relates to a method whereby vehicles may be automatically conveyed from one level to another or from floor to floor by elevator means, conveyed along a horizontal plane to a predetermined position and then stored by moving the vehicle at right angles to its longitudinal axis. By storing vehicles with their axes parallel to an aisle, and by moving said vehicles into and out of an aisle with their axes substantially parallel to the aisle the width of the aisle may be reduced to substantially the width of a vehicle, thereby eliminating a great deal of space that was hitherto unavailable for storing purposes.

Furthermore, my invention contemplates storing the vehicles along one or both sides of an aisle with the axis of the vehicles parallel to the aisle and the vehicles inclined to the horizontal, thereby allowing a certain amount of overlapping to occur between vehicles of equal length. It is well known that automobiles, for example, are generally provided with front and rear bumpers and ordinarily carry spare tires, trunks and other accessories which project materially beyond the wheel base of an automobile.

By placing such automobiles in a row and then tilting each automobile in the same general direction, it is possible to somewhat reduce the total length of a line of such automobiles by placing the forward bumper of one automobile slightly beneath the rear bumper of a preceding automobile. In this manner, a larger number of vehicles may be stored within a given area.

In the drawings:

Figure 1 is a vertical section taken through a portion of a building utilizing the vehicle storing and handling system, the vertical section embracing a portion of the lower or loading floor, together with a portion of the upper or storing floor and illustrating elevating means in two positions.

Figure 4 is a plan view partly broken away of one form of elevating means which may be used in carrying out my invention.

Figure 5 is an elevation partly in section, taken along the lines 5—5 of Figure 4, and illustrating one means of tilting a vehicle receiving runway in the elevator means and regulating such tilting action.

Figure 6 is a diagrammatic representation of the electrical circuit employed in raising or tilting the vehicle runway in the elevator means.

Figure 7 is a side elevation partly in section taken along line 7—7 of Figure 4 illustrating the vehicle receiving runway in the elevator means, together with vehicle retaining means provided upon such runway.

Figure 8 is a side elevation partly in section taken along line 7—7 of Figure 4 but illustrating the position assumed by the various parts when a vehicle is retained upon said runway.

Figure 9 is a horizontal section taken along the line 9—9, of Figure 8.

Figure 10 is an enlarged side elevation, partly broken away, of a portion of the runway shown in Figures 7 and 8.

Figure 11 is a side elevation, partly in section, of a portion of a mechanical latch used in the retaining means shown in Figures 7 and 8.

Figure 12 is a plan view, partly in section, of a portion of the latching device shown in Figures 7, 8, and 11.

Figure 13 is a front elevation, partly in section of an aisle and vehicle receiving means positioned adjacent to the aisle and in the aisle, taken along line 13—13 of Figure 2.

Figure 14 is a vertical front section taken through a portion of a vehicle receiving means as along line 14—14 of Figure 2, the vehicle receiving means being empty.

Figure 15 is a side elevation of a portion of vehicle receiving means with a retaining means in loaded position.

Figure 16 is a front elevation, partly in section, of a portion of vehicle receiving means and retaining means when said vehicle receiving means is in the aisle. This view also illustrates means for retaining the vehicle receiving means in a stall.

Figure 17 is a rear elevation, partly in section, taken along line 17—17 in Figure 15 and illustrating an automatic means for releasing the vehicle retaining means upon the vehicle receiving means.

Figure 18 is an enlarged view of a portion of the device shown in Figure 17.

Figure 19 is a diagrammatic representation of a switch in various positions, said switch being also shown in Figure 16.

Figure 20 is a side elevation, partly in section, of one form of device whereby vehicle receiving means may actuate means for moving vehicles along an aisle and means for moving the vehicle receiving means out of the aisle.

Figure 21 is a side elevation of a portion of a vehicle receiving means in position over vehicle guides in an aisle.

Figure 22 is a diagrammatic plan view together with a wiring diagram illustrating means for moving vehicle receiving means into and out of an aisle.

Figure 23 is a diagrammatic representation of elevator doors in closed position, together with a wiring diagram showing means for opening and closing the doors automatically.

Figure 24 is a wiring diagram illustrating one method by means of which the release of retaining means upon the vehicle receiving means may be controlled.

Figure 25 is a side elevation partly diagrammatical taken along line 25—25 of Figure 2 and illustrating means for actuating, and means for moving vehicle receiving means into and out of an aisle.

Figure 26 is a plan view partly in section showing means for moving vehicle receiving means out of an aisle.

Figure 27 is a side elevation, partly in section, of a conveyor in the act of conveying a vehicle into a vehicle receiving means.

Figure 28 is a side elevation of a conveyor after a vehicle has been placed upon the vehicle receiving means.

Figure 29 is a front elevation of the conveyor in the position shown in Figure 28.

Figure 30 is a diagrammatic illustration of means for regulating the tilting of a portion of vehicle guides and floor upon a storage floor.

Figure 31 is a diagrammatic illustration of a momentary contact type switch which may be used in energizing the electric circuits used in activating the various means, the switch being designed to insure proper sequence of operations.

Figure 32 is an electric circuit diagram illustrating means whereby the various means may be coordinated and energized. Figure 32 illustrates a circuit after a vehicle has been placed upon an elevator and such elevator is moving to a storage floor.

Figure 33 is a wiring circuit illustrating conditions existing when an empty elevator is being sent to a storage floor to receive a vehicle.

Figure 2:
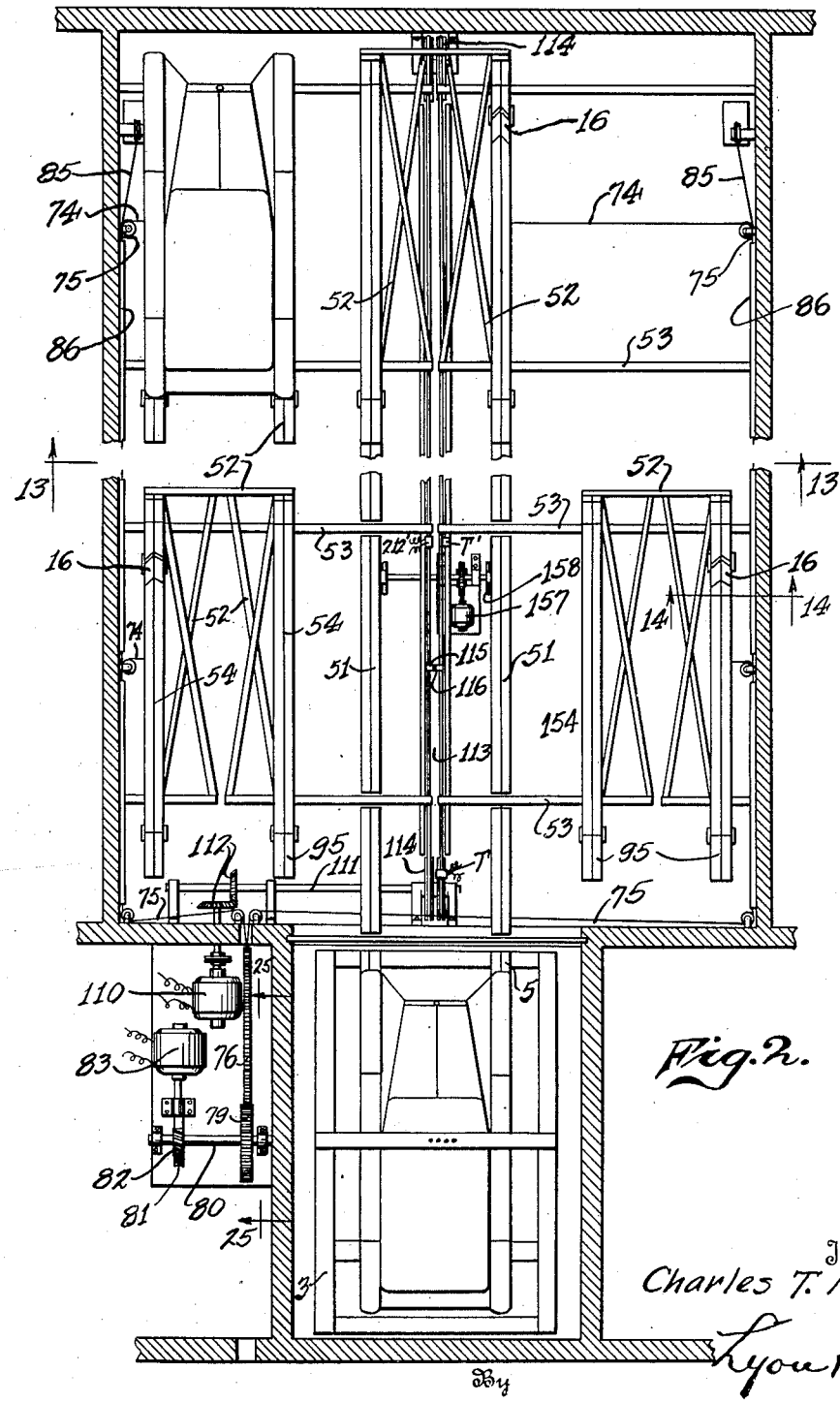
Figure 2 is a horizontal section or plan partly broken away showing the arrangement of vehicle retaining means with relation to an aisle and elevating means and illustrating one method and means employed in moving the vehicle receiving means into and out of the aisle.

Referring to Figure 1, 1 represents a turntable which may be constructed and operated in any suitable manner, for example, by means of a motor 2. Preferably the turntable 1 is positioned directly in front of a suitable elevator means such as the elevator 3. The elevator 3 is preferably provided with an entrance through doors 4, which may be of the center parting type. It will be understood that similar doors will be provided on the numerous floors at which the elevator may stop.

The elevator 3 may be constructed in any suitable manner and need not necessarily embrace a complete floor. Vehicle receiving means, such as the V or channel iron guides or runways 5 are preferably provided, however, and such runways or vehicle guides may be mounted upon an I or H beam 6 as shown in Figure 5. The elevator 3 may be provided with means for tilting the floor or runways or guides 5 toward the entrance to said elevator and such tilting means may comprise a motor 7 provided with a worm gear 8 in engagement with a worm 9 mounted upon a shaft 10 supported in suitable bearings 11 and terminating in eccentric cam plates 12.

The floor or runway 5 may bear an idler roller 13 pivotally mounted and connected thereto as by means of shackle bolt 14, the idler roller 13 riding upon the cams 12. It will be understood that the runways or vehicle guides 5 together with all connected members are pivoted at their forward ends to the elevator 3, as shown at 15, the rear end of the runways 5 being not connected to the elevator.

Means are provided for locking a vehicle in position upon the runways 5 such means comprising an arcuate V or U shaped portion 16 adapted to roll in such runways and pivotally connected to the runways 5 by suitable means, such as, for example, the plate 17 provided with an aperture 18 and a pin 21 connected to member 16 and extending through aperture 18. Spring means 19 may be provided for maintaining the vehicle retaining device in receptive position.

A ratchet arm 20 may be connected to the locking portions 16 by means of the pin 21 passing through the aperture 18 in the plate 17. The lower portion of the ratchet arm 20 may be slidably received in a socket 21' pivotally connected as at 22 to a lug 23 connected to the tilting portion of the elevator floor.

A pawl 24 is provided for engaging with the ratchet arm 20 when the retaining means 16 are carried into position shown in Figure 8 by the indicated vehicle wheel. The pawl 24 is slidably mounted in a housing 25 (see Figure 11) and is yieldably urged against the ratchet arm 20 by means of a compression spring 26 contained within the housing 25.

The pawl 24 is provided with an aperture through which extends a pin 27, the pin 27 being provided at its upper end with a pin 28 slidably mounted in a yoke 29 formed in the end of lever 30, which is pivotally connected to the tilting floor of the elevator at 31. The other arm 32 of the lever 30 is pivotally connected to a rod 33 passing through an aperture formed in the bottom of the vehicle receiving means in the bottom of the runway 5 and terminating in a button 34. The housing 25 in which the pawl 24 is mounted may be provided with a longitudinal aperture 35 and with a horizontal aperture 36.

The elevator is also provided with a pivoted lever 37 extending slightly beyond the forward edge of the elevator 3 so as to contact with a catch 38 rigidly connected to a vertical shaft 39 journaled in a bearing 40 connected to the lower portion of a center parting door 4. The shaft 39 is preferably provided with a helical groove or keyway 41 which performs one-half revolution throughout the length of the shaft 39. The lower portion of shaft 39 passes through a bearing block 42 provided with a key adapted to be slidably received in the helical keyway 41, the bearing block 42 being rigidly connected to the floor or wall of the elevator shaft.

When the door 4 is in open position, the lug or catch 38 engages with the bell crank lever 37 depressing said bell crank lever which is pivoted at 43, thereby causing the lever arm 44 connected to the lever 37 to move rearwardly of the elevator.

The lever 44 is loosely connected to a link 45 pivoted to an extension of the housing 25 at 46. The rearward motion of the lever 44 causes it to assume the position shown in dotted lines in Figure 12 thereby moving the pin 27 extending into the horizontal aperture 36 toward the rear end, causing pawl 24 to be withdrawn into the housing 25.

When a vehicle is being placed upon the elevator as indicated in dotted lines in Figure 7, the vehicle will contact and depress the button 34 thereby causing the lever 30 to be raised and withdrawing pin 27 from contact with link 45. This enables spring 26 to force the pawl 24 outwardly so that by the time the vehicle wheel comes in contact with the abutting block 47 and is retained in this position by the member 16, the pawl 24 may contact with the ratchet arm 20, thereby preventing the vehicle from rolling back.

The shaft 33 terminating in button 34 passes through a switch O which is connected to the floor tilting motor 7 through the switch P which may be provided with buttons 48 and 48' adapted to be depressed or actuated by rollers 49 and 49' positioned on the cam 12 at diametrically opposed points corresponding with the points of maximum elevation or depression which may be obtained by the rotation of the cam 12. Movement of lever 33 through the switch O closes the circuit and actuates the tilting motor 7, thereby raising the runways 5, but at the completion of one-half revolution of cam 12, the circuit is broken by depression of button 48 by means of roller 49' carried by the cam 12. A diagrammatic representation of the circuit involved is shown in Figure 6.

The next successive operation of the switch O actuates the motor 7 to rotate the cam 12 a second half revolution to lower the runways 5. At the completion thereof, the roller 49 actuates the button 48' to stop the motor.

Means are provided for raising and lowering the elevator 3 together with the tilting floor or runways 5, such means comprising, for example, an elevator motor 50 connected to a suitable hoisting and, if desired, leveling apparatus. The means for raising the elevator 3 are diagrammatically shown in Figure 1.

Figure 3:
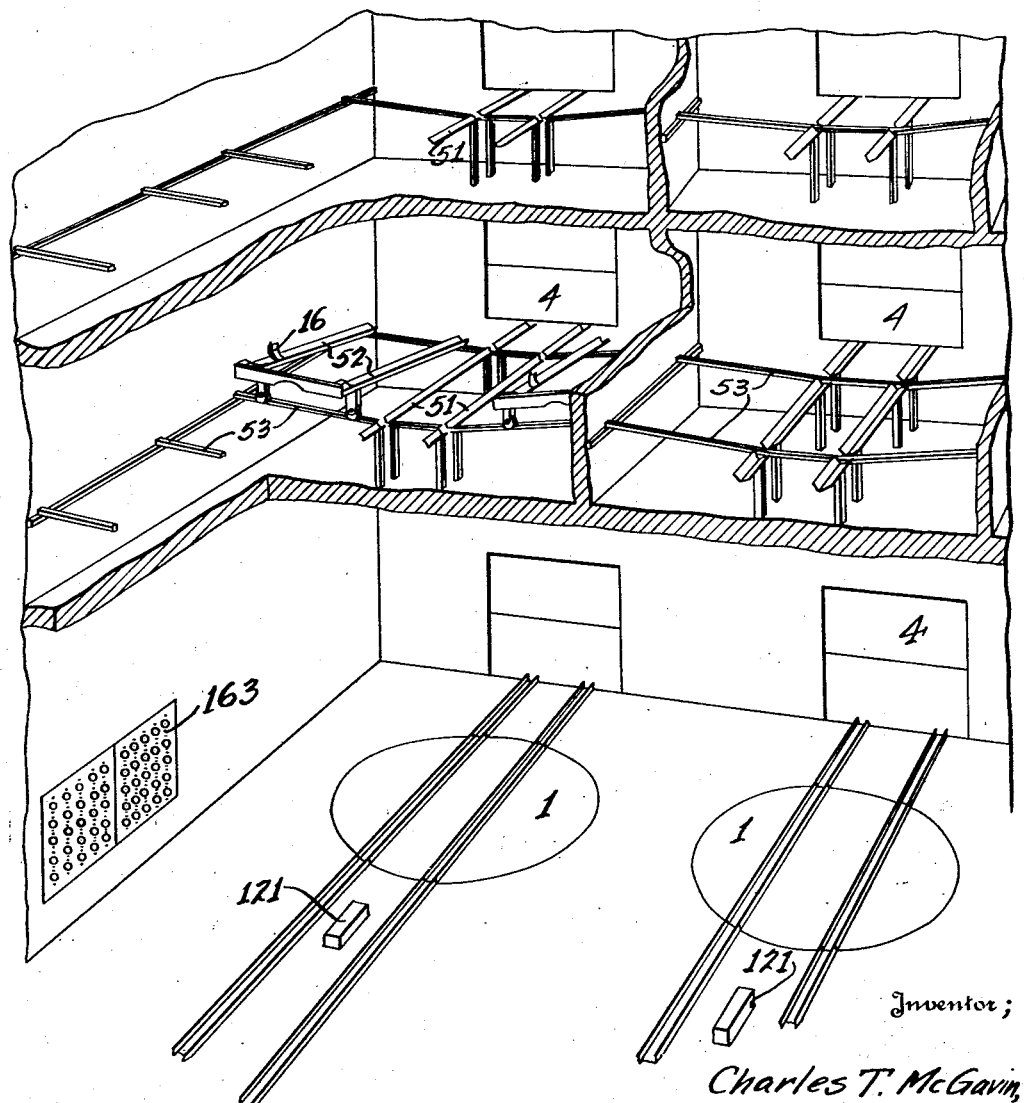
Figure 3 is a perspective view of a vehicle storing and handling system illustrating a loading floor and two storing floors, details of the construction being omitted in order to avoid confusion.

In the preferred embodiment of my invention the storage floors for vehicles comprise a central aisle which may be provided with vehicle guide means 51 leading to an entrance to the elevator. Adjoining the aisle and parallel thereto may be a plurality of vehicle receiving means such as the trucks 52 shown in a general manner in Figure 2. The trucks 52 may preferably be adapted to run upon guide rails 53 extending transversely of the aisle and aisle guide means 51, the rails 53 being slightly inclined toward the aisle 51 so as to allow the trucks or vehicle receiving means 52 to roll down the guides or tracks 53 toward the aisle 51 by gravity. Furthermore, the vehicle receiving means 52 are preferably inclined toward the elevator entrance and are provided with vehicle retaining means thereon. The general arrangement of trucks 52, guide rails 53 and aisle guides 51 is shown in Figures 2, 3 and 13.

In more detail, the vehicle receiving means 52 may consist of parallel guides adapted to receive a vehicle, for example, the guides 54 suitably connected together, braced, and provided with flanged wheels 55 and 56 adapted to rest and roll on the tracks 53.

It will be understood that in the preferred embodiment of my invention the rear portion of the vehicle receiving means 52 is at a higher elevation than the front portion, thereby tilting the receiving means toward the elevator entrance.

Means may be provided upon the trucks or vehicle receiving means for retaining vehicles thereon, such means being similar in general to the vehicle retaining means used in the tilting floor of the elevator. For example, as shown in Figure 15, the vehicle retaining means may comprise a retaining member 16, ratchet arm 20, ratchet arm receiving member 21, pawl 24, and spring means 19. The lower portion of the ratchet socket member 21 is pivotally connected to an extension 57 connected to the truck 58 bearing the wheels 55. The pawl 24 is slidably mounted in an extension 59 connected to the truck 58. The pawl is provided with a pin 60 slidably received in a slot formed in the end of a bell crank lever 61. A pawl 24 is yieldably urged toward the ratchet arm 20 by means of a spring 62 connected to the lever 61 the tension of the spring 62 being translated into a forward motion of the pawl 24 through the intervention of pin 60 in the slot made in lever 61. This is clearly shown in Figures 15 and 17.

The lever 61 is pivotally connected to the truck 58 as shown at 63 and the arm 64 of lever 61 engages with pivoted lever 65 (see Fig. 17) which in turn is connected through a link 66 to a link 67 which is pivotally connected to the truck 58 at 68. A catch 69 is also pivotally connected to the truck 58 by the pin 68, the catch being provided with a lug 70 adapted to engage with link 67 when the lower portion of catch 69 is moved in a direction away from the center aisle, but to swing freely with no effort upon link 67 when the end of catch 69 assumes the dotted position shown in Figure 18. The mechanism just before described constitutes a release actuating the pawl 24. For example, if a vehicle is retained upon the truck or vehicle receiving member 52 by means of the retaining member 16 in the position shown in Figure 15 and said truck is moved along guide rails 53 toward the aisle (which is provided with vehicle guide member 51) the catch 69 will engage with the edge of vehicle guide 51, depressing pivoted lever 65 and thereby causing lever 61 to withdraw 24 from engagement with ratchet arm 20 allowing the retaining member 16 to release the vehicle being retained on the vehicle receiving means. This release, however, is only momentary or sufficient to allow the retaining member 16 to be fully depressed and as soon as the catch 69 assumes the position shown in Figure 17 the tension in spring 62 connected to lever 61 is sufficient to cause pawl 24 to extend in position for ready engagement with the rachet arm 20. When a vehicle is placed upon the vehicle receiving means 52 and retained thereon by means 16 and the vehicle receiving means then moved out of the aisle, into a stall, the catch 69 will again contact with the side of the vehicle guide 51 but such motion will be toward the aisle (into the position shown in dotted lines in Figure 18) and such movement has no effect upon the releasing mechanism.

Means are provided for retaining the receiving means 52 upon the inclined guide rails 53. Such means are similar to those hereinabove described for the vehicle receiving means proper and tilting floor in the elevator but are more specifically shown in Figures 14 and 16. These means include a segmental portion 70 adapted to roll upon the guide rails 53 and pivotally connected to a rachet arm 20 by means of a pin 21 extending through a aperture 18 in a plate 17 connected to the guide rail 53. A releasing mechanism for this retainer comprises a pawl 24 which constitutes the core of a solenoid 71. The pawl is provided with a shoulder 72 which is yieldingly urged toward the rachet arm 20 by means of a compression spring 73. By energizing the solenoid 71 the compression spring 73 may be overcome thereby causing pawl 24 to be removed from engagement with the rachet arm 20, this operation releasing the truck retaining means.

Means are provided for moving the vehicle receiving means 52 or the like into and out of the aisle. When the tracks or guide rails 53 are inclined toward the aisle as shown in Figures 3 and 16, for example, the vehicle receiving means may be allowed to move from a stall into the aisle by gravity. The means for moving the vehicle receiving means from the aisle back into the stall may comprise the means illustrated in Figures 2, 13, 25 and 26. Referring to Figure 2 it will be seen that each vehicle receiving means 52 is connected by means of a sub-cable 74 to a main cable or other suitable means 75, said main cable running along the wall or partition or slightly exteriorly of the stall in which the vehicle receiving means 52 may be stored. The main cable 75 may be connected to a rack gear 76 slidably mounted in suitable guides 77. The rack gear 76 is preferably provided with a stop 78.

Above the rack gear 76 a segmental ring gear 79 may be provided, said gear 79 being mounted upon a shaft 80 driven by suitable reduction gear means such as the worm gear 81 and worm 82, the worm 82 being mounted upon the shaft of a motor 83. The diameter of the gear 79 and the size of the teeth thereon is such that when the segmental gear 79 is rotated and the teeth carried thereby engage the rack gear 76, said gear 76 is caused to travel a lineal distance sufficient to cause the cable 75 attached to the rack gear 76 to move the vehicle carrying means from a position over vehicle guides 51 in the aisle into a stall, where said vehicle receiving means will be retained by the retaining means shown in Figures 14 and 16. At the completion of the revolution or partial revolution of segmental gear wheel 79, the milled portion 84 of said gear permits disengagement of the ring gear 79 with the rack gear 76 thereby allowing said gear 76 to assume the position shown in Figure 25. This return movement of the rack gear 76 may be caused by means of counterweights attached to a cable 85 which is also connected to the main cable 75.

Ordinarily, therefore, with all of the vehicle receiving means in their respective stalls the cable 75 will be under tension imparted thereto by the counterweights fastened to the cable 85 and the sub-cables 74 will be slack. When a vehicle receiving means 52 is released by operation of the solenoid 71 (see Fig. 14) the vehicle receiving means 52 will move down the guides or rails 53 into the aisle into a position above the aisle guides 51 and the cable 74 will then more or less maintain the vehicle receiving means 52 in correct position above the aisle guides 51.

Referring to Figure 26 the main cable 75 may be retained within a hollow housing or conduit 86 provided with openings through which the sub-cable 74 may extend. As has been stated before, the sub-cable 74 may be connected to the main cable 75 as shown at 87 and be passed over a pulley 88 pivotally mounted in a hanger 89 connected to the housing 86. Any suitable means of connecting the sub-cable 74 to the vehicle receiving means 52 may be employed for example, the end of the sub-cable 74 may be passed through a hook 90 connected to the vehicle receiving means 52 and spliced or tightened as shown at 91. A collar 92 may be connected to the sub-cable 74, said collar being adapted to contact with a stop 93 carried by the hanger 89, thereby limiting the outward movement of the sub-cable 74, and centering the vehicle receiving means 52 over the aisle guides 51. The position assumed by the sub-cable 74 when the vehicle receiving means 52 are in a stall is shown by dotted lines in Figure 26. In order to maintain the sub-cable 74 in contact with the pulley 88 the sub-cable 74 may be caused to pass through an aperture in a stop or hanger 94, also connected to the pulley hanger 89.

The V or U shaped vehicle guides 54 carried by the vehicle receiving means 52 will necessarily terminate slightly above the aisle vehicle guides 51. In order to allow vehicles to be readily transferred or moved from the aisle guides 51 to the guides 54 carried by the vehicle receiving means, and vice versa, an apron guide 95 may be provided as shown in detail in Figure 21.

The apron guides 95 may be connected to a hanger 96 pivotally connected to the vehicle receiving guide means 54 as shown at 97. A compression spring 98, carried by the vehicle guides 54 and adapted to exert a pressure upon the pivoted hanger 96 may be provided, thereby normally maintaining the apron guide 95 in a substantially horizontal position. The partial weight of a vehicle, however, should be sufficient to depress the apron guide 95, thereby assisting in centering the vehicle receiving means over the aisle guide 51 and allowing the vehicle to readily roll or be moved from the vehicle receiving means into the aisle guides 51 or in reverse direction.

As a modification of the means hereinabove described for moving the vehicle receiving means into and out of the aisle, means may be provided for moving the vehicle receiving means positively into the aisle and out of the aisle. This modification would therefore, eliminate the necessity of having the guide rails 53 inclined toward the aisle. This positive means of moving the vehicle receiving means is shown in Figure 22 and may comprise a driven shaft 99 extending parallel to the aisle guide means 51 and driven through suitable gearing by a motor 100. The shaft 99 may be provided with a plurality of magnetic clutches 101, it being understood that a clutch is provided throughout the length of the shaft 99 for every stall and vehicle receiving means. Each magnetic clutch 101 may be provided with a sprocket 102 journaled upon the shaft 99 and adapted to drive a continuous flexible chain 103 which may pass over a sprocket 104 mounted upon a shaft 105. It will be understood that when the shaft 99 is positioned near the wall of a stall, then the shaft 105 is positioned near the aisle guide means 51 or near the center of the aisle. The continuous flexible chain 103 may be provided with dogs 106 carried thereby, such dogs 106 being adapted to engage with a lug or arm carried upon the vehicle receiving means.

Each vehicle receiving means conveyor 103 may be provided with a limit stop arm 107 as shown diagrammatically in Figure 22. The limit stop arm 107 may be provided with suitable energizing solenoids 108 and 109 and carrying switches adapted to complete the circuit with the motor 100. The operation of this mechanism will be described in detail in connection with the wiring diagrams shown in Figures 30 and 31. Means are also provided preferentially centrally of each aisle for moving vehicles longitudinally along the aisle guides 51. One form of such means is shown in Fig. 2 and comprises a motor 110 adapted to drive a shaft 111 by means of suitable gear such as is indicated at 112. The shaft 111 is adapted to drive a conveyor 113 running longitudinally down the aisle, by means of sheave wheels or the like 114 mounted on the shaft 111. As shown in Figure 2 the conveyor 113 may consist of two parallel cables connected by means of a link 115 carrying an upright arm 116, said arm being adapted to engage with a vehicle placed upon the aisle guides 51.

In order to facilitate engagement with vehicles of various sizes, a connecting strip or arm such as is illustrated in Figures 27 and 28 may be provided, said arm comprising a hinged clamp 117 and including a downwardly extending portion 118. The clamp 117 may be placed on any suitable portion of a vehicle as, for example, a front axle 119 and attached thereto by any suitable means, for example, the wing bolt 120. The downwardly extending portion 118 may be vertically adjustable so as to compensate for various vertical positions assumed by the axles 119. In order to cause the lower end of the vertically adjustable member 118 to assume a standardized position above the floor blocks 121 may be provided as shown in Figure 3, thereby enabling the operator to adjust the height of the downwardly extending member 118 when applying the clamp to a vehicle. It will be understood that the arm 116 carried by the conveyor 113 contacts with the member 118 carried by the vehicle thereby moving the vehicle along the aisle guides 51 in a direction depending upon the direction of travel of the conveyor 113.

A modified form of conveyor is shown in Figures 27, 28 and 29. In this form of conveyor two cables 113 are used joined together by means of a link 122, the links 122 being provided with rollers 123 adapted to be slidably received in horizontal guides 124 positioned beneath the guide rails 53. The links 122 may carry a conveyor arm 116 pivotally connected to the link 122 as shown at 125. The links 122 may also be provided with a stop 126 abutting the pivoted conveyor arm 116.

Ordinarily the conveyor arm 116 is maintained in vertical position by means of a pawl 127 pivotally connected to the arm 116 as at 128, said pawl 127 engaging with a lug 129 rigidly connected to the link 122. A tension spring 130 may connect the arm 116 with the link 122 so as to cause the pawl 127 to engage the lug 129 whenever said lug is disconnected. The vehicle receiving means 52 provided with the vehicle guides 54 may also be provided with a centrally disposed and downwardly extending arm 131 so positioned with respect to the longitudinal motion of the conveyor arm 116 as not to contact therewith. The arm 131 is preferably provided with an inclined shoe 132 in the face thereof, said shoe being adapted to receive and raise a pin 133 projecting from the pawl 127.

When a vehicle is being conveyed along the aisle by the conveyor the arm 116 will contact with the member 118 as shown in Fig. 27, the conveyor arm 116 moving in the direction of the arrow. The conveyor arm 116 is maintained in vertical position by reason of the pawl 127 engaging the lug 129. If the conveyor arm 116 here being used to move a vehicle in the opposite direction, the arm 116 would be maintained in a rigid vertical position by reason of the fact that it would abut the stop 126. Referring again to Figure 27 which illustrates a vehicle being pushed onto an inclined vehicle receiving means, the arm 116 contacts with the member 118 and as the vehicle approaches the upper end of the vehicle receiving means and is retained thereon by a retaining means (not shown in Figure 27 but hereinbefore described in detail) the arm 116 will assume the position shown in Figure 28 by reason of the fact that the pin 133 projecting from pawl 127 will engage with the inclined shoe 132 formed in the lower portion of the member 131 carried by the vehicle receiving means, thereby lifting the pawl 127 and disconnecting the same from contact with lug 129. This release permits the conveyor arm 116 to yield to the member 118 and become disengaged therefrom, the pin 133 passing through an opening 134 formed in the member 131. After the conveyor arm 116 has become disengaged with the member 118 carried by the vehicle the tension of spring 130 brings the conveyor arm 116 into vertical position and the disengagement of pin 133 with the member 131, allows the pawl 127 to again engage the lug 129 carried by the link 122.

When the conveyor arm and the conveyor are moving in a direction opposed to that shown by the arrows in Figures 27 and 28 it will be apparent that the pin 133 will enter the member 131 in a low position below the opening 134 mentioned before. In order to release the pin 133 the shoe 132 is pivotally connected to the member 131 as shown at 135 and an opening 136 provided in the member 131, thereby allowing the pin 133 to lift the shoe 132 while passing through the member 131 in this direction.

Means are also provided whereby when a vehicle is loaded upon a vehicle receiving means and retained thereon the vehicle receiving means will be automatically moved transversely to the aisle and into a stall. Such means are illustrated in Figures 14, 15, 16, 19 and 20, but particularly in the latter.

The rear truck 58 of a vehicle receiving means may be provided with an aperture in which is slidably received a link 138 carrying a pin 139 pivotally connected to the link 138. The pin 139 extends into the vehicle guides 54 and is adapted to contact with the retaining member 16 when the vehicle receiving means is loaded and the retaining means is in locked position. The outer end of the link 138 may be pivotally connected to an arm 140 rigidily connected to the truck 58. The link 138 also carries a contact arm 141 which is pivotally connected to the link 138 and which is slidably mounted in an aperture formed in the arm 140. The link 138 is yieldably urged upwardly by means of a suitable compression spring 142 positioned in the aperture made in the truck 58.

When the vehicle receiving means 52 are in position over the aisle guides 51, the contact arm 141 hereinabove described is positioned directly above a switch box 143 which contains a double set of contacts forming switches C and C'. The housing 143 contains a pivoted switch arm 144 provided with an inclined upper face 145 which is complementary to the inclined lower face 146 of arm 141. Arm 141 is of such length that when an empty vehicle receiving means moved out into an aisle, the lower tip of arm 141 does not contact with the switch arm 144. When, however, a vehicle is moved onto the vehicle receiving means and the retaining member 16 assumes the position shown in Figure 20, such movement of the vehicle retaining means 16 depresses pin 139, thereby causing the arm 141 to be depressed. Downward motion of arm 141 causes contact between the inclined face 146 carried by arm 141 with the inclined face 145 carried by the switch arm 144, thereby moving the switch arm to the right-hand dotted position shown in Figure 19. Such movement closes switch C (right-hand side of Figure 19) which energizes the solenoid 216 (Figure 25) thereby closing the circuit and activating motor 83 which causes the vehicle receiving means to be moved into a stall.

When a loaded vehicle rolls out into an aisle the tip of arm 141 contacts with switch arm 144 thereby moving it into the position indicated at Figure 19 closing the switch C'. The closure of switch C' causes energization of solenoid 255 which closes an appropriate circuit adapted to activate motor 110 to drive the aisle conveyor shown in Figures 27 to 29 in the proper direction so as to remove the vehicle from the vehicle receiving means and toward an elevator entrance.

In Figure 23 there is illustrated a center parting elevated door of a type which may be used on each floor. Although details of construction are not shown in Figure 23, the operation and construction of center parting doors is well known in the art. It may be stated, however, that the center parting doors may be actuated by means of cables 147 passed over suitable pulleys 148 and 149, one of said pulleys being driven as by means of gears 150 and a motor 151.

The lower portion of the center parting door may be connected to the cable 147 by means of a lug or other connection 152 while the upper portion of the door may be connected to that portion of cable 147 traveling in an opposite direction as by means of a lug or arm 153. The movement of the elevator doors may be controlled by a limit stop and reversing switch K comprising a link 226 connecting switch arms $k$ and $k'$. The switch arm $k$ may be so arranged as to open a circuit when the door or upper portion of door 4 reaches its upward limit of travel and the switch arm $k'$ may be caused to open a circuit when the door or upper portion of the door 4 reaches its lower limit of travel. In view of the fact that arms $k$ and $k'$ are connected by the link 226 the opening of one portion of switch will close the other. The leads from the switch arms k and k' pass through the motor 151, commutator or field in opposite directions and through the relays J. The link 226 may also carry a lug 237 adapted to activate a switch D which closes an elevator motor circuit when the switch K responds to a complete closure of the elevator doors 4. The action of this switch K together with switch D will be more fully described later when the complete circuit is described.

When a vehicle retained on a vehicle receiving means 52 is to be removed from a stall immediately in front of the elevator, such as, for example, the stall 154 (Figure 2) some difficulty may be encountered in having the aisle conveyor move the vehicle into the elevator. In order to obviate any difficulty, a tilting floor section may be provided immediately in front of elevator. Such tilting floor section is shown in Figures 1 and 2 and a detail is shown in Figure 30.

The aisle vehicle guides 51 immediately in front of elevator entrance may form a separate section independent from the other aisle guides 51 by separating the first section as, for example, shown at 155. This first section of aisle guide means 51 may be pivotally connected to the building or floor as indicated at 156, and means may be provided for tilting said floor section toward the elevator entrance.

As shown in Figures 1 and 2, a motor 157 mounted upon a suitable pedestal beneath the tilting aisle guides 51 may be connected by suitable gearing to a cam or eccentric plate 158 similar somewhat to the cam or eccentric 12 used in the elevator floor tilting mechanism. The cam or eccentric 158 may contact with the tilting aisle guide 51 through a suitable roller 159 mounted on the tilting aisle guides 51. The periphery of eccentric 158 may be provided with lugs or limit stop arms 262 and 265 adapted to contact with a switch I when the cam 158 reaches positions of maximum raise or drop. The details of this switch and method of making contact are shown in Figure 30.

The limit stop arms 262 and 265 carried on the eccentric 168 are of such size as to merely depress cores 161 and 162 passing through solenoids 264 and 261 sufficiently to throw the switch I (pivotally connecting cores 161 and 162) into a neutral or open position. By energizing solenoid 261 circuit is made by the switch I with the motor 157, thereby causing rotation of cam 158 until the limit stop 262 or 265, as the case may be, again throws switch I into open position. As has been said before, by locating the limit stops 262 and 265, the diametrically opposed points on the cam or eccentric 158, the motor 157 may be caused to perform only one-half revolution at a time, thereby raising or lowering the tiltable aisle guides 51 automatically.

Figure 32 illustrates a wiring diagram by which all of the various elements hereinbefore described are operated and co-ordinated by closing, this figure referring particularly to the circuits used in delivering a car from the main floor to its particular stall.

Figure 32 shows the conditions shortly after the button has been pressed, with the floor doors closed and the elevator approaching the particular storage floor upon which it is desired to place the car.

For each stall in the garage, there is on the switchboard 163 and "up" and a "down" button and an indicating light which is illuminated when the stall is occupied. Each of these buttons is connected, through appropriate circuit closers, to its particular elevator mechanism, truck or vehicle receiving means, release mechanism, aisle conveyor mechanism, floor tilting mechanism in the elevator and on the storage floor, means for moving the trucks into and out of the aisle, and the elevator and storage floor door operating mechanism. For clearness of illustration, a single button circuit is shown as connected to operate its own particular series of mechanism for a single stall.

The feed line or live circuit energized upon initial pressure of the button is shown in heavy lines. The control circuit energized directly by pressure of the button is shown in light lines. Circuits and operating mechanisms pertaining to each particular means are shown enclosed in dotted lines and designated on the drawings under the heading of the means which they control.

The "up" and "down" diagrams 32 and 33 are shown as two separate circuits. The motors used in each case will be the same and the separation of the circuits will be accomplished by appropriate relays which have been omitted from the diagram for the sake of clearance. Various mechanical devices also employed for separation of the circuits are shown in the drawings.

Throughout the following description of Figures 32 and 33, reference will be made to up and down circuits. By an up circuit is meant a series of operations carried out whenever a vehicle is to be placed in storage, for example, wherever a vehicle is placed upon an elevator carried to a storage floor and then stored in a stall upon such floor. It will be understood that a complete "up" operation includes the movement of an elevator to a storage floor with a vehicle and the return of the elevator to the loading floor or main floor.

By a "down" operation is meant the steps of sending an empty elevator to a floor upon which the vehicle is stored, moving the vehicle out of its stall into the aisle and from the aisle into the elevator, and then bringing the elevator down with the vehicle to the main or delivery floor. Furthermore, it will be understood that although in describing these operations it is assumed that the storage floors are all above a loading or main floor, the invention is not limited to such arrangement but may be used by having all of the storage floors below a loading floor.

The "up" button on the switchboard is of the momentary contact type, a diagrammatic illustration of which occurs in Figure 31. For clearness, in Figure 32, it is shown as a button 200 energized from a line 201, through the relays S and S' having switch bars 202 and 203, respectively, and the button feeder circuit 204. The button feeder circuit supplies all of the buttons controlling all of the stalls on all of the floors dependent upon a single elevator. Operation of the button 200 momentarily supplies current to the "up" control circuit 205. The pressure of this button 200 also energizes the magnet 206 of the relay E having a switch bar 207, which in turn energizes the "up" feeder circuit 208 from the main line 201. Energization of the circuit 208 supplies current to the magnet 209 of the relay S, disconnecting the button feeder circuit 205 from the main line 201. Relay S is controlled by tension spring 210, tending to maintain the feed to the button circuit 204. Magnet 209 is continuously energized against the tension of the spring 210 to break relay 202 as long as the up feeder circuit 208 is energized. Upon breaking the circuit 208 through the relay E by supplying current to the magnet 206—a, the tension spring 210 closes the relay S, again restoring the circuit between the main line 201 and the button feeder circuit 204. Relay S' is operated in a like manner from the "down" button circuit in a manner to be later described.

Supposing now that it is desired to take a car from the main floor to a particular stall on a particular storage floor, the "up" control circuit 205 is momentarily energized by pressing the particular button 200 for that stall, as previously described.

The feeder circuit 208 is connected to the main line and supplies current to the elevator supplying the aisle upon which that stall is located. Through the circuits 208—a, the means for moving trucks into and out of the aisle, the aisle conveyor and the elevator door on the storage floor for that particular stall, is also supplied with current.

Circuit 205 directly supplies the truck release solenoid 71, releasing the empty truck in that stall and allowing it to roll down the inclined tracks, into the aisle. At the same time, a solenoid 211 of the reversing switch G controlling the conveyor motor 110, is energized, pulling the switch bars g from neutral position shown in dotted lines, to the position shown in this figure, thereby starting the conveyor motor to bring the conveyor arm 116 into its position in front of the elevator doors for the reception of a car from the elevator. A limit stop 212 at this position operates the switch G to bring it to a neutral position, shutting off the current to the motor 110 and stopping the conveyor in proper receptive position.

As the car leaves the elevator in the way hereinafter to be described, the member 118 upon the car operates the switch T, appropriately located along the aisle with relation to the stopping position of the conveyor arm 116; the switch T is of the momentary contact type and is designed to operate only upon the passage of the car in a direction from the elevator.

As the car passes in this direction, appropriate contact surfaces 118—a upon the member 118 and t' upon the operating bar t, close the switch T by the sliding action of the bar t in guideways in the switch body. Travel of the car in the opposite direction will pivot the switch arm t about the pin 213 against the action of the compression spring 214 without operation of the switch T. Closure of the switch T energizes the solenoid 215, controlling the switch G, to throw the switch bar g toward the opposite contacts to reverse the motor 110, starting it in a direction away from the elevator.

As the arm 116 meets the member 118, the car is carried forward onto the truck or receiving means 52 hereinbefore described. As the car passes onto the truck 52, the catch 16 thereon is operated, closing the switch C, (shown in Figure 19) in a manner previously described, energizing the magnet 216 controlling the relay switch U and thereby connecting the motor 83 with the feeder circuit 208—a through the switch bar u. A series magnet 217 may be used to retain the switch U in closed position against the action of the tension spring 218, until the truck 52 is drawn into the stall, whereupon the limit stop 219, also connected with the switch bar breaks the circuit, disconnecting the motor 83 from the feeder circuit 208—a.

Referring back now to the delivery of the car to the particular storage floor described, the control circuit 205 is also connected to the solenoid 220 of the elevator motor, reversing switch M, and energization thereof throws this switch M into position for upward movement of the elevator. For convenience of illustration, the elevator motor 50 in the diagram is shown as being situated in the elevator, but would, of course, be in its usual position in the building.

Control circuit 205 also is connected to the solenoid 221 of the storage floor elevator control switch L and to the solenoid 221' of the main floor elevator control switch L'. These switches may be of any of the various types of automatic elevator control switches and the elevator circuits may be of any of the usual automatic types employed. The elevator circuit is shown as being fed through the series of storage floor door safety switches k' and through a series of parallel switches L, N, and L', N', etc.

Switches L are controlled by the various control circuits 205 upon the pressure of the particular button 200, there being one of the switches L for each floor connected with its respective series of stall buttons 200. The switches N are controlled by the passage of the elevator. As long as these switches L are closed, the making and breaking of the switches N by the passage of the elevator does not break the elevator motor circuit. However, if the switch L upon the particular floor is open, as shown, by energization of the solenoid 221, then the opening of the corresponding parallel switch N by the passage of the elevator will break the circuit at that point, thus stopping the elevator at the floor desired.

The switches L and N, in Figure 32, control the elevator at the storage floor. The switches l' and N' control the elevator at the main floor. Solenoid 221, in addition to breaking the elevator motor circuit, which we shall designate generally as 222, closes the circuit 223 supplying energy to the motor 151 controlling the elevator doors upon the particular floor selected.

The switch L' is normally in open position and door switch K' upon the main floor is also normally in the open position, inasmuch as the main floor doors are open, except while the elevator is in use. As the vehicle enters the elevator immediately prior to the operation of the catch 16, it actuates the button 34 to operate a switch O controlling the motor 7 for tilting the elevator floor in the manner previously described. The circuits from switch O pass through the switch P, the two switches O and P being in series. Each of these switches O and P consists of a double set of contacts so connected that one set of contacts is made when the other is broken. In the showing of Figure 32, the double switch bars are shown as connected by links to illustrate such action. Motor 7, therefore, is supplied by two parallel circuits, each of which is adapted to be either opened or closed by either of the switches O and P.

The button 34 may actuate the usual type of ratchet switch in which successive operation of the switch will alternately close one of the parallel circuits through the switch P and open the other. As illustrated in Figure 32, the lower circuit is opened by the switch P, the floor trough 5 being tilted corresponding to the pressure of button 48 by roller 49' in Figure 5. As the car entered the elevator, the lower circuit was closed through P and opened through O. Pressure of the button 34 closed the switch O, completing the circuit through the elevator motor, operating the cam 12 to one-half revolution, whereupon roller 49' contacts with button 48, opening the lower circuit through P and closing the upper circuit. As the car emerges from the elevator, the rear wheels passing over the button 34 closed the upper circuit through O, starting the motor 7 for a second half revolution to level the trough 5 when it is shut off by contact of the roller 49 and the button 48'.

As the car enters the elevator operation of the vehicle locking means 16 actuates the switch B, supplying current to the circuit 224 to control the door closing motor Z of the main floor. This circuit 224 is interrupted by the hand switch V, momentarily completing the circuit 224 through the solenoid 225 of the relay J.

The elevator doors on each floor are controlled by the limit stop and reversing switch K, comprising switch arms k and k', the switch arm k being arranged to open as the door reaches its upward limit of travel, and the arm k' to open as the door reaches its lower travel limit.

The arms k and k' are connected as by a link 226, so that opening of the one portion of the switch will close the other, the switch bar k being in contact with the circuit 208 when the doors are closed and the switch bar k' in contact when the doors are open. The leads from the bars k and k' pass through the motor commutator or field in opposite directions and through the relays J to ground.

At the time the car is driven into the elevator, therefor, the arm k' will be in contact with the circuit 208 and the circuit will pass through the motor Z and the contact 227 and switch bar j to ground in a direction to close the elevator doors. Such circuit, however, is open until pressure of the hand switch V energizes the magnet 225 to pull the switch bar j into contact with the contact point 227. Inasmuch as the switch V is of the momentary contact type, the series solenoid 228 is used to maintain the switch bar j in its contact position until the momentary breaking of the circuit through the motor Z during the movement of the switch K. This switch K is of the snap-over type, and after the initial breaking of the contact, is carried over the center point as by the motor inertia, but the momentary break in the circuit is sufficient to release the switch bar j which is immediately returned to balanced position by the balance springs j'.

Closure of the elevator doors starts the elevator motor 50 by closing the switch K' interposed in the elevator circuit 222, permitting current from the circuit 208–a to pass through it to the elevator motor through the switch L', previously closed by the operation of the push button 200. Closure of the elevator doors also brings the switch bar k into contact with the circuit 208, making the circuit through the motor Z in the opposite direction, so that upon energization of the magnet 229, in a manner to be later described, the switch bar *j* will be drawn to the left, making contact with the contact point 230 and permitting current to pass through the motor Z at the opposite direction to ground, operating this motor in a direction to close the doors. The switch Q controlling the magnet 229 is also of the momentary contact type and a series magnet 231 maintains contact in the same manner as the magnet 228.

As the elevator passes upwardly along the shaft, the several switches N are opened as by the projection 232 upon it, breaking, however, but one side of the circuit 222 supplying the motor 50, until the floor is reached, where the control relay L has been opened by the energization of the solenoid 221. As the elevator passes and opens the corresponding switch N at this point, the elevator motor circuit 222 is broken and the elevator is stopped by any of the usual means.

Opening of the switch N momentarily supplies current from the elevator circuit 222 ahead of the switches L and N to the contact point 233, supplying current to the magnet 229 of the relay J, controlling the operation of the door operating motor 151 upon the storage floor.

This motor 151 is controlled through a switch K similar to the switch K previously described as controlling the operation of motor Z. As previously stated, operation of the magnet 229 throws the switch bar *j* to the left, closing the circuit in a direction to open the doors. When the doors reach their fully open position, the circuit is automatically shut off and the connections reversed, ready for closure of the doors by energization of magnet 225. Opening of the doors releases the car retaining catch in the elevator mechanically, as shown in Figures 7 to 12 inclusive, as previously described. As the car rolls into the aisle, switch T is operated, as previously described, starting the conveyor. A lug 234 upon the conveyor, similar to the member 118 upon the car, operates a switch T' similar in all respects to the switch T, energizing the magnet 225 of the relays J pulling the switch bar *j* to the right and permitting current to pass through the motor 151 in a direction to close the elevator doors.

Closure of the elevator doors operates the uni-directional switch D similar in construction to the switch T and T' to connect the circuit 235 with the circuit 20'—*a*, energizing the solenoid 236, forming a portion of the switch M, controlling the elevator motor 50, the solenoid 236 reversing the switch M to send current through the motor 50 in a direction to lower the elevator. Circuit 235 also energizes the solenoid 238 of the relay L, again closing the elevator motor circuit 222 through this switch.

Circuit 235 also energizes the solenoid 241 to break the elevator circuit through the relay L', so that upon opening of the switch N' by the downward travel of the elevator (N' opening and closing the elevator circuit in exactly the opposite direction from the switches N) upon reaching the main floor, the elevator will be brought to a stop. The switch D is operated by a lug 237 upon the connecting link 226 of the switch K. Energization of the circuit 235 is momentary and takes place just prior to the complete closing of the door. Upon complete closing of the door, the switch K' is closed, again energizing the elevator motor circuit through the switches L and M, starting the elevator down.

As the elevator passes down through its shaft, the switches N previously opened, are successively closed. Opening of the switch N' upon the main floor operates the uni-directional switch Q, similar to the switch T, previously described. This switch momentarily connects the solenoid 229 with the feeder circuit 208 operating the relay J, which controls the main floor door operating motor Z, operating this motor in a direction to close the doors.

Uni-directional switch R, similar in detail to the switch T previously described, is operated by a lug 239 upon the connecting link 226 of the main floor switch K.

The switch R is adapted to be operated upon opening of the door and just prior to the extreme limit of such opening, and momentarily energizes the circuit 240 connected to the magnet 206—*a* and relay E. Magnet 206—*a* opens the switch bar 207, disconnecting the feeder circuit 208 from the main line 201, thus disconnecting the magnet 209 of the relay S and permitting the spring 210 to close this relay, reenergizing the button feeder circuit 204. This places the entire circuit in its original condition ready to be operated by depressing of a successive button.

The mechanical arrangement of the "up" and "down" push buttons, as illustrated in Figure 31, is such that a succeeding pressure of the "up" button will have no effect upon the various circuits until the corresponding "down" button has been pressed and the stall emptied of its car. This mechanical arrangement, previously described, therefore insures the sequence of operations in filling and emptying a particular stall.

Referring now to Figure 33, which illustrates the "down" circuit, and shows a corresponding position to the showing of Figure 32 in regard to the "up" circuit, i. e., shortly after the "down" button has been pressed and the elevator is in transit, upward, to receive a car from the storage floor for delivery to the main floor.

The down button operates through the switch shown in Figure 31, but for simplification of the diagram, is shown as a simple momentary contact switch 250 operating the "down" relay E' by energization of the solenoid 251 in the same manner as the relay E was operated in the "up" circuit, supplying current to the "down" feeder control circuit 252 and to the magnet 253 which opens the relay S' in series with the relay S supplying current to the button feeder circuit 204 in the same manner as previously described for the "up" circuit. Likewise, the control circuit 254 is momentarily energized by pressure of the button 250.

Before proceeding with the description of the "down" operation, it may be stated that the switches and releases U, K, K', D, J, L, L', M, N, N', O, P, Q, R, are identical in construction with the similarly designated switches of the "up" circuit.

Energization of the circuit 254 operates the solenoid 71, releasing the truck and allowing it to roll into the aisle. The truck is, of course, now loaded and the mechanical arrangement shown in Figures 14, 15, 17 and 18 serve to release the retaining catch, allowing the vehicle to roll into the aisle. Simultaneously with the operation of the solenoid 71, control circuit 254 energizes the solenoid 211' which forms a part of the reversing switch G' controlling the conveyor motor 110.

This switch is thrown in such a direction as to cause the conveyor to travel toward the elevator. As the truck reaches the aisle, in a loaded condition, the switch C' is operated, closing the magnet 255, which closes the motor circuit through the switch bar 256 between the feeder circuit 252 and the motor supply circuit 257 connected to the switch G'. This starts the motor 110, carrying the conveyor toward the elevator.

As the arm 116 reaches the vehicle, it contacts with the member 118, carrying the vehicle towards the elevator, until the stop 212' disconnects the switch G', stopping the conveyor. This stop 212' is preferably located as shown in Figure 2, so that the conveyor is stopped immediately the car is in position in front of the elevator door. C' is but a momentary contact switch and the series magnet 258 provided for a continuation of the circuit until broken by contact of the conveyor with the limit stop 212'.

When the switch G' is in open position, the switch G'' connected with it is closed, supplying current for actuating the floor tilting relays H and I upon opening of the elevator doors, as will be later described.

Simultaneously with the energization of solenoid 71 and 211, the circuit 254 energizes the magnet 225' of the relay J controlling the main floor motor Z and throwing the switch bar j in a direction to close the elevator doors. Also, the circuit 254 energizes the switches L' and L in the same manner as they are energized by the control circuit 205 previously described in the "up" circuit. Upon closure of the main floor doors, therefore, the elevator motor circuit is completed through the switches K' and the switch L', and the solenoid 220' is also energized by the control circuit 255 to throw the elevator motor switch M in a direction to cause the elevator to travel upward until it strikes the switch N opposite the switch L, which has been opened. Operation of that particular switch N energizes the magnet 229 of the relay J, operating the same so as to send the current supplied to the left hand contacts of switch L through the motor 151 in a direction to open the storage floor doors. When the doors are open, contact is made between the supply circuit 252 through the switch F to supply current to the magnet 259 of the relay H, through the switch G'', previously mentioned. The switch bar h of the relay H makes a momentary contact through the switch point 260 with solenoid 261 of the relay switch I supplying current from the motor circuit 252 to the floor tilting motor 157, which operates the cam 12 shown in Figures 1 and 30, one-half a revolution, when the limit stop 262 brings the switch bar to a central and open position.

This tilts the first section of the floor directly in front of the elevator to which the vehicle has previously been delivered by the conveyor and down which the car travels into the waiting elevator.

During the time the elevator is at this particular floor, the contacts A are together. As the vehicle enters the elevator and operates the retaining catch 16 therein the switch B', is operated, this being of the momentary contact type. This energizes the sub-control circuit 263 supplying the current to the magnet 225', of the relay J, completing the circuit through the door motor 151 in direction to close the door. Closing of the door breaks the switch F, permitting the relay H to release and the switch bar h being at this time dead, no actuation of the solenoid 261 takes place on the return motion.

Circuit 263 also has connections leading to the solenoid 264, throwing the relays I to the other motor contact point, restarting the motor 157 and lowering the floor section by rotation of the cam 12 another half turn, when it is shut off by the limit stop 265 and again the switch I is brought to a mid or open position.

Circuit 263 is also connected with solenoid 266 and with magnet 267 operating the switch G' and reversing the motor 110 to return the conveyor to its original position, where it is stopped by the limit stop 268 and the switch G' is thrown again into neutral.

Circuit 263 is also connected with a magnet 216' of the switch U controlling the motor 83, thus energizing this motor to pull the truck back into the stall where it is stopped as in the "up" circuit by the limit stop 219. Closing of the elevator door operates the switch D to energize the solenoid 236' of the elevator motor switch M to send current through the elevator motor 50 in a direction to cause the elevator to descend after the door has completely closed and the elevator motor circuit completed through the closing of the switch K'. The closing of the switch D also energizes the solenoid 238' of the relay L.

Solenoid 241' forming a part of the relay L' on the main floor is energized, breaking one of the elevator motor supply circuits at this point.

Entrance of the car into the elevator operates the switch O through the button 34, as previously described, causing the floor tilting motor 7 to be operated to tilt the floor. The limit switch P operates as before, to shut off the motor when the floor has been tilted, as the elevator reaches the main floor.

As the elevator reaches the main floor, the switch N' is opened, completely severing the elevator motor circuit and stopping the elevator. Opening the switch N' operates the switch Q as in the "up" circuit, energizing the magnet 229' of the main floor relay J to open the main floor elevator doors.

Opening of the main floor elevator doors mechanically releases the retaining catch within the elevator, as shown in Figures 7 to 12 inclusive, and previously described, allowing the vehicle to roll down the inclined elevator floor and into the main floor aisle and over the turn table 1, shown in Figures 1 and 3. As the car passes over the button 34, the switch O is operated, closing the circuit through the motor 7 which turns the cam 12 a half a turn to lower the elevator floor when it is shut off by the limit switch P, as before described.

Opening of the main floor elevator doors also actuates the switch R through the circuit 240, resetting relay E' and allowing the relay S' to close. The circuit 240 is the same for both "up" and "down" circuits.

From the hereinabove description it will be seen that I have provided means for automatically handling and storing vehicles in a new and novel means and have provided means for automatically coordinating the various means, movements and actions so that a vehicle is positively transported from one point to another and parked or stored by merely placing a vehicle upon an elevator and pressing a button. I am not to be limited, however, to a completely automatic handling and storing system in which all of the operations are performed automatically as it may be desirable, for example, to merely utilize a storage floor plan and means as described by me without utilizing an automatic elevation coordinating with said storage floor, or it may be desirable to use an ordinary elevator provided with a floor tilting and vehicle retaining means by not coordinating with a storage floor means such as has been described. Furthermore, I am not to be limited to a system in which inclined trucks or vehicle receiving means are employed as flat trucks may be used and such trucks moved into and out of an aisle by the conveyor shown in Figure 22 or similar means. Although a number of details have not been shown such details have been left out for purposes of clarity, it being well understood that the coordination and final completion of the circuits and means described herein comes within the skill of those employed in the arts. For the same reason, although some modifications have been described in detail, my invention is not to be limited to the specific disclosures made but embraces other modifications coming within the skill of the art and within the scope of the following claims.

I claim:

1. A vehicle storing system comprising, an aisle, vehicle guides extending longitudinally down said aisle, a plurality of vehicle receiving means adjoining the aisle, means for selectively moving said last named means into and out of said aisle and transversely to said vehicle guides, means for tilting said vehicle receiving means, and means for moving vehicles along said aisle.

2. A vehicle storing system comprising, an aisle, a plurality of vehicle receiving means adjoining the aisle, means for selectively moving said last named means into and out of said aisle and transversely thereto, means for tilting said vehicle receiving means, means for moving vehicles along said aisle, elevator means provided with an entrance into said aisle, and means for moving a vehicle from said aisle onto said elevator means.

3. A vehicle storing system, comprising an aisle, vehicle guides extending longitudinally down said aisle, a plurality of vehicle receiving means, tracks inclined toward the aisle and adapted to receive said vehicle receiving means, means for retaining said vehicle receiving means upon said inclined tracks, means for selectively releasing said last named retaining means, means for selectively moving said vehicle receiving means up said inclined tracks, and means for moving vehicles along said aisle.

4. A vehicle storing system comprising, an aisle, vehicle guides extending longitudinally down said aisle, vehicle receiving means, means for retaining vehicles upon said vehicle receiving means, means for selectively moving the vehicle receiving means into and out of said aisle, and means for moving vehicles along said aisle.

5. A vehicle storing system comprising, an aisle, vehicle guides extending longitudinally down said aisle, a plurality of vehicle receiving means adjoining the aisle, means for selectively moving said last named means into and out of said aisle and transversely to said vehicle guides, means for retaining vehicles upon said vehicle receiving means, and means cooperating with aisle vehicle guides for releasing last named retaining means.

6. A vehicle storing system comprising, an aisle, vehicle guides extending longitudinally down said aisle, elevator means provided with an entrance into said aisle, a plurality of vehicle receiving means adjoining the aisle said vehicle receiving means being longitudinally inclined toward said elevator means, means for retaining vehicles upon said vehicle receiving means, means for selectively moving the vehicle receiving means into and out of said aisle, and means for moving vehicles along said aisle.

7. A vehicle storing system comprising an aisle, vehicle guides extending longitudinally down said aisle, elevator means provided with an entrance into said aisle, a plurality of vehicle receiving means longitudinally inclined toward said elevator means, tracks extending transversely to said aisle and inclined thereto and adapted to receive said vehicle receiving means, means for retaining vehicles upon said vehicle receiving means, means for retaining said vehicle receiving means upon said inclined tracks, means for selectively releasing said last named retaining means and means for moving the vehicle receiving means into and out of said aisle, and means cooperating with aisle vehicle guides for releasing means for retaining the vehicles upon said vehicle receiving means.

8. A vehicle storing system comprising, an aisle, vehicle guides extending longitudinally down said aisle, elevator means provided with an entrance into said aisle, a plurality of vehicle receiving means longitudinally inclined toward said elevator means, tracks extending transversely to said aisle and inclined thereto and adapted to receive said vehicle receiving means, means for retaining vehicles upon said vehicle receiving means, means for retaining said vehicle receiving means upon said inclined tracks, means for selectively releasing said last named retaining means and means for moving the vehicle receiving means into and out of said aisle, means cooperating with aisle vehicle guides for releasing means for retaining vehicles upon said vehicle receiving means, and means for moving vehicles along said aisle.

9. In a vehicle storage system, the combination of an elevator provided with an entrance, a vehicle receiving runway in said elevator, means for retaining a vehicle in position upon said runway, means for moving said elevator and means for cooperating with said vehicle retaining means for activating said elevator moving means.

10. In a vehicle storage system, the combination of an elevator provided with an entrance, a vehicle receiving runway in said elevator, means for retaining a vehicle in position upon said runway, means for tilting said runway toward said entrance, and means cooperating with said vehicle retaining means for activating said last named means when a vehicle is retained upon the runway.

11. In a vehicle storage system, the combination of an elevator provided with an entrance, a vehicle receiving runway in said elevator, means for retaining a vehicle in position upon said runway, means for tilting said runway toward said entrance, means cooperating with said vehicle retaining means for activating said last named means when a vehicle is retained upon the runway, doors opening to the elevator entrance, and means for releasing said vehicle retaining means when said door is open.

12. A vehicle storage system comprising an elevator provided with an entrance, a vehicle receiving runway in said elevator, means for retaining a vehicle in position upon said runway, means for moving said elevator, means for tilting said runway toward said entrance, means cooperating with said vehicle retaining means for activating said last named means when a vehicle is retained upon the runway and for activating said elevator moving means, doors opening to the elevator entrance, and means for releasing said vehicle retaining means when said door is open.

13. A vehicle storage system comprising an elevator provided with an entrance, a vehicle receiving runway in said elevator, means for retaining a vehicle in position upon said runway, means for moving said elevator, means for tilting said runway toward said entrance, and means cooperating with said vehicle retaining means for activating said last named means when a vehicle is retained upon the runway and for activating said elevator moving means.

14. A vehicle storage system comprising an elevator provided with an entrance, a vehicle receiving runway in said elevator, means for retaining a vehicle in position upon said runway, doors opening to the elevator entrance, and means actuated by opening of said doors for releasing said vehicle retaining means.

15. An automatic vehicle handling and storage system comprising; an elevator provided with a vehicle runway, vehicle receiving means upon said runway and an entrance; an aisle provided with vehicle guides and communicating with an elevator entrance, means for moving vehicles along said aisle, vehicle receiving means positioned adjacent to said aisle and adapted to be moved into and out of said isle; means for moving said elevator, means for moving vehicle receiving means into and out of said aisle, and a control board provided with means for selectively energizing, coordinating and activating the various means.

16. An automatic vehicle handling and storage system comprising; an elevator provided with a vehicle runway, vehicle receiving means upon said runway, an entrance to said elevator, means for tilting the runway towards said entrance, means for retaining a vehicle upon said runway; an aisle provided with vehicle guides and communicating with an elevator entrance, means for moving vehicles along said aisle, vehicle receiving means positioned adjacent to said aisle and adapted to be moved into and out of said aisle; means for moving such elevator, means for tilting the runway in the elevator, means for activating vehicle retaining means on said runway, means for moving vehicle receiving means into and out of said aisle, and a control board provided with means for controlling selectively energizing, coordinating and activating the various means.

17. An automatic vehicle handling and storage system comprising: an elevator provided with a vehicle runway, vehicle receiving means upon said runway, an entrance to said elevator, means for tilting the runway towards said entrance, means for retaining a vehicle upon said runway; an aisle provided with vehicle guides and communicating with an elevator entrance, means for moving vehicles along said aisle, vehicle receiving means positioned adjacent to said aisle and adapted to be moved into and out of said aisle; means for moving such elevator, means for tilting the runway in the elevator, means for activating vehicle retaining means on said runway, means for moving vehicle receiving means into and out of said aisle, and a control board provided with means for simultaneously energizing the means for moving the elevator, and means for moving a vehicle receiving means into the aisle and for coordinating and activating the other means.

18. A vehicle storing and handling system comprising, an elevator provided with an entrance, a vehicle receiving runway in said elevator, means for retaining a vehicle in position upon said runway, means for moving said elevator, an aisle, vehicle guides extending longitudinally down said aisle, a plurality of vehicle receiving means adapted to be moved into and out of said aisle, means for selectively moving said last named means, means for retaining vehicles upon said vehicle receiving means, means for moving vehicles along said aisle, means for concurrently energizing elevated moving means and selectively energizing means for moving a vehicle receiving means into the aisle, and means cooperating with vehicle retaining means upon said elevator runway for actuating the elevator runway and for actuating the elevator moving means.

19. A method of handling and storing vehicles comprising, moving a vehicle longitudinally down an aisle, tilting said vehicle and then moving said tilted vehicle laterally out of said aisle.

20. A method of handling and storing vehicles comprising, moving a vehicle in a verticle plane, then moving said vehicle longitudinally down an aisle, tilting said vehicle and then moving said tilted vehicle laterally out of said aisle and storing the vehicle in tilted position parallel to said aisle.

21. A method of handling and storing vehicles comprising, moving a vehicle in a vertical plane, tilting said vehicle toward an aisle, moving the vehicle longitudinally down said aisle, then tilting the vehicle in an opposed direction and moving the tilted vehicle laterally out of said aisle.

Signed at Los Angeles, California, this 10th day of August, 1928.

CHARLES T. McGAVIN.